(No Model.)

H. ROBINSON.
Hydrant.

No. 238,311. Patented March 1, 1881.

Witnesses:
R. G. Orwig
Frank W. Heers

Inventor:
Hiram Robinson,
By Thomas G. Orwig,
attorney.

UNITED STATES PATENT OFFICE.

HIRAM ROBINSON, OF DES MOINES, IOWA.

HYDRANT.

SPECIFICATION forming part of Letters Patent No. 238,311, dated March 1, 1881.

Application filed May 17, 1880. (No model.)

*To all whom it may concern:*

Be it known that I, HIRAM ROBINSON, of Des Moines, in the county of Polk and State of Iowa, have invented an Improved Hydrant, of which the following is a specification.

The object of my invention is to save material, labor, and expense in constructing, setting, operating, and repairing a hydrant.

It consists in forming, arranging, and combining a valve-chamber and valve with an underground supply-pipe and a discharge-pipe to produce a complete hydrant, in such a manner that the valve-seat can be readily lifted with the discharge-pipe and detached for making repairs, or removing chips, pebbles, or other obstructions whenever necessary, without moving any earth; in forming a screw-threaded aperture for operating the valve in the upper section of the valve-chamber, where it cannot be affected by frost, and in forming a waste or vent in the upper section of the chamber, to extend outward from the screw-threaded aperture, and to be opened and closed by the screw on the valve-stem, all as hereinafter fully set forth.

Figure 1:
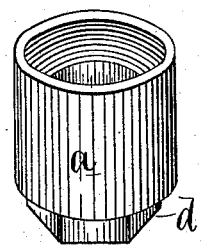
Figure 2:
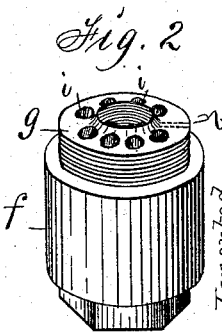
Figure 3:
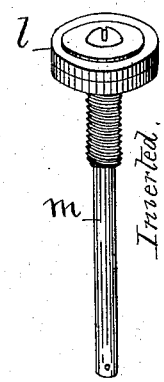
Figure 4:
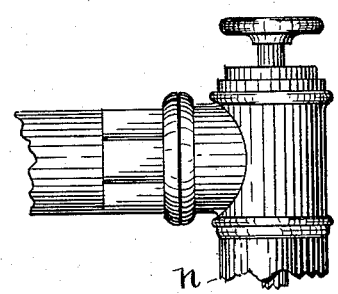
Figure 4:
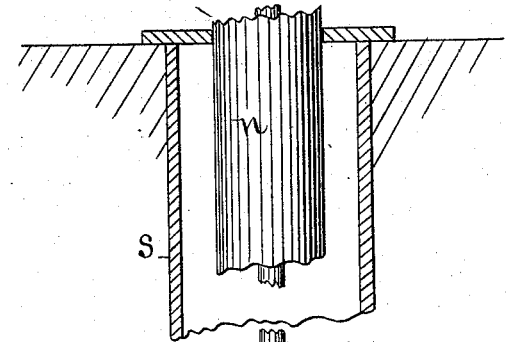
Figure 4:
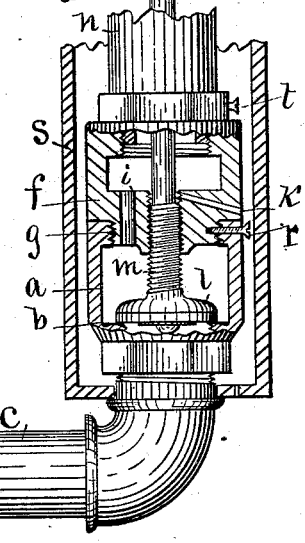

Figure 1 of my accompanying drawings is a perspective view of the lower section of my valve-chamber, that is designed to serve as a detachable valve-seat. Fig. 2 is a perspective view of a section that contains the screw-threaded aperture and the vent for carrying off waste water. Fig. 3 represents the valve and stem. Fig. 4 is a sectional view, showing the parts combined and applied as required for practical use. Jointly considered, these figures clearly illustrate the construction, application, operation, utility, and advantages of my invention.

$a$ is the lower section of the valve-chamber, in the form of a straight tubular casting. The upper portion of its bore is enlarged to form an annular shoulder and valve-seat, $b$, in its lower portion. It has a female screw in its top end, to engage a corresponding male screw on the lower end of the upper section of the chamber. It also has a female screw in its lower end, to engage the male screw on the end of the service or supply pipe $c$. The outside surface of the lower end, $d$, is made six-sided or angular, as required, to engage a wrench.

$f$ is the upper section of the valve-chamber. It corresponds in diameter with the lower section, and has an extension, $g$, at its lower end, that is threaded on its outside, to engage the screw in the upper end of the section $a$. It also has a screw-threaded aperture in its center, through which the valve-stem passes, and a series of perforations, $i$, in its body, through which water is allowed to pass upward from the lower section, $a$, to the discharge-pipe.

$k$ is a vent that is drilled from the outside of the section to intersect the top portion of the screw-threaded aperture formed in the center of the extension $g$.

$l$ is a compression or screw-down valve, designed to fit upon the valve-seat $b$. Its stem $m$ extends up through the discharge-pipe $n$ and a stuffing-box at its top, to be accessible and readily operated by means of a hand-wheel or wrench, to raise and lower the valve at pleasure. That portion of the valve-stem that passes through the extension $g$ of the upper section of the valve-chamber has a screw-thread formed on its surface, to engage the female screw in the aperture formed in the center of the said extension $g$.

$r$ is a set-screw passed through the side of the lower chamber-section, $a$, to engage the extension $g$ of the upper section, and thereby rigidly connect the two sections, as required, to prevent them from separating when the complete hydrant is rotated for the purpose of detaching it from the underground service-pipe $c$, and lifting it out of the incasing-tube $s$, in which it is inclosed while under ground.

$t$ is a set-screw, by means of which the lower end of the discharge-pipe is rigidly connected with the upper end of the valve-chamber, to prevent the parts from separating while under ground.

A complete, simple, and efficient hydrant of any size desired can be thus readily formed of two straight castings, a valve and stem, and a discharge-pipe having a stuffing-box at its top, and more easily set in a case in the ground in such a manner that it can be lifted out bodily, taken apart, and replaced, whenever desired, with less material, labor, and expense than any hydrant heretofore known.

In the practical operation of my hydrant the flow of water is readily controlled by simply turning the valve-stem and moving the valve up and down, relative to the valve-seat, by means of the screw-threaded aperture formed in the extension $g$ of the upper section of the valve-chamber. When the valve is raised the screw-thread on the valve-stem closes the vent $k$, and when it is lowered it opens the vent to allow the water in the discharge-pipe to escape, as required, to prevent it from freezing and affecting the valve-operating screw.

I am aware that valve-chambers in hydrants have been made in two parts; but in no instance has a screw-threaded aperture been formed in a section of the chamber to engage the valve-stem for the purpose of operating the valve, nor has a vent been made to intersect a screw-threaded aperture in such a manner as to be opened and closed by the movement of the valve-stem.

I claim as my invention—

1. An improved hydrant composed of the following elements, to wit: the detachable valve-chamber section $a\ b$, the valve-chamber section $f\ g$, having perforations $i$, and a screw-threaded aperture in its center, the valve $l$, having a screw-thread on the lower portion of its stem, and the tube $n$, substantially as shown and described, for the purposes specified.

2. In a hydrant, a valve-chamber composed of two sections, and having a screw-threaded aperture in the center of one section, and a vent intersecting said aperture, in combination with a screw-threaded valve-stem for the purpose of operating the valve, as set forth.

HIRAM ROBINSON.

Witnesses:
FRANK W. HEERS,
R. G. ORWIG.